United States Patent [19]

Kazaoka et al.

[11] 4,337,978
[45] Jul. 6, 1982

[54] MECHANISM FOR ADJUSTING INCLINATION ANGLE OF SEAT

[75] Inventors: Kenichi Kazaoka, Nagoya; Koji Hirao, Kariya; Hideki Takahasi, Hekinan, all of Japan

[73] Assignee: Aisin Seiki Kabushiki Kaisha, Kariya, Japan

[21] Appl. No.: 143,012

[22] Filed: Apr. 23, 1980

[30] Foreign Application Priority Data

Apr. 28, 1979 [JP] Japan .................................. 54-52814

[51] Int. Cl.³ ........................ A47C 1/026; B60N 1/06
[52] U.S. Cl. ................................................... 297/367
[58] Field of Search .............................. 297/367, 379

[56] References Cited

FOREIGN PATENT DOCUMENTS 1430115 7/1969 Fed. Rep. of Germany ...... 297/367

Primary Examiner—Robert Mackey
Attorney, Agent, or Firm—Oblon, Fisher, Spivak, McClelland & Maier

[57] ABSTRACT

A hinge fitting mechanism especially for motor vehicle seats in which a fixed seat plate fixedly connected to the seat and a tiltable plate fixedly connected to the back rest are articulatedly connected to each other and which includes a mechanism for gradually adjusting the position of the plates relative to each other, and a quick tilting of the tiltable plate and hence the seat back connected thereto relative to the fixed seat plate connected to the actual seat portion.

2 Claims, 8 Drawing Figures

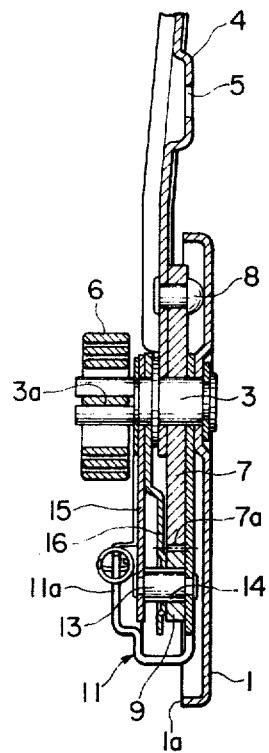
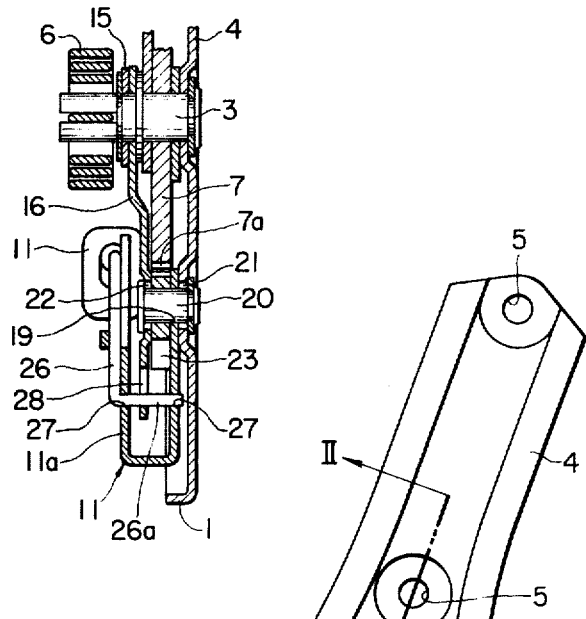
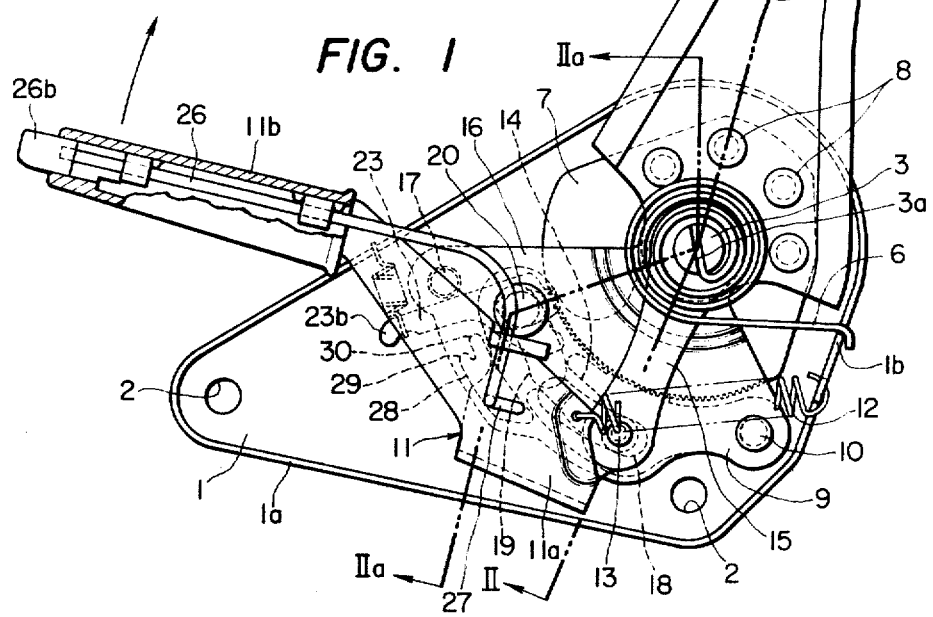

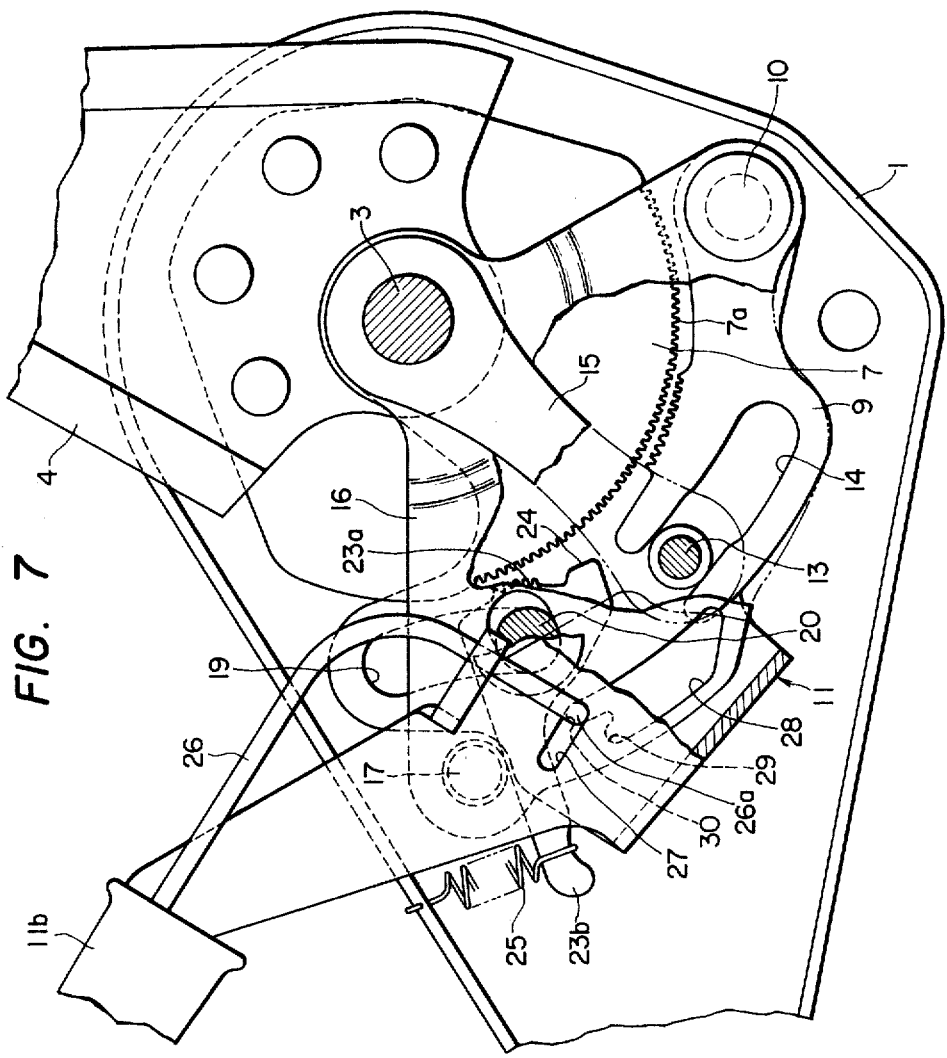

MECHANISM FOR ADJUSTING INCLINATION ANGLE OF SEAT

BACKGROUND OF THE INVENTION

1. Field of the Invention

This invention relates to a mechanism for adjusting the inclination angle of the seat back to the seat base in which a toothed member or latch gear segment is secured to the seat back or back rest and another toothed member is pivoted to the seat base and in disengaging the teeth for angular adjustment the pivoted toothed member is manually turned about the pivot with respect to the other toothed member to take the teeth out of mesh.

2. Description of the Prior Art

In known mechanisms of this type the pivoted toothed member is so constructed as being manually driven for both fine and quick adjustment of the back rest relative to the seat. The disadvantage of this is that for very fine adjustment of the inclination angle, the manual effort tends to result in over tilting or under tilting of the back rest so that at least one or more readjustment is usually required to attain to a suitable value of the inclination angle of the back rest.

SUMMARY OF THE INVENTION

A principal object of the invention is therefore to provide a hinge fitment mechanism in which there is positive assurance of uniform fine turning followed by automatic self-locking of the back rest for every turn of a manual handle without any conscious effort by the operator and in which, if desired, the back rest may be tilted freely with respect to the fixed seat base to any desired position to thus provide for quick adjustment of the back rest relative to the base seat.

The foregoing object and others are attained according to at least one aspect of the invention by provision of a second pivoted toothed member engageable with the latch gear segment alternately with the first pivoted toothed member and including an additional non-toothed portion to cooperate with the teeth for locking the latch gear segment in position after allowing a fine angle of turning for the latch gear segment.

The preferred embodiment of the invention therefore includes a seat plate adapted to be fixedly connected to the seat, a tiltable plate adapted to be fixedly connected to the back rest, a pivot mechanism pivotally connecting the seat plate and the tiltable plate together, a spring mechanism for normally urging the tiltable plate towards forward upon movement of the passenger on the seat, a latch gear segment mechanism fixed to the tiltable plate, first pawl a mechanism having a number of teeth cut on its periphery for being meshed with or unmeshed with the latch gear segment mechanism and pivoted to the seat plate, a lever mechanism pivoted to the seat plate and operatively connected to the first pawl mechanism through first cam mechanism. A second pawl mechanism having a number of teeth cut on its periphery for meshing with or being unmeshed with the latch gear segment mechanism and a pivot pin member fast therewith and operatively connected to the lever mechanism through second cam mechanism, a guide slot formed in the seat plate slidably engaged by the pivot mechanism of the second pawl mechanism, the second pawl mechanism further having a separate non-toothed portion on its periphery sized in height such that the teeth and the non-toothed portion may co-engage the latch gear segment mechanism for locking the latch gear segment in position, the relation between the first cam mechanism and the second cam mechanism being such as to assure alternate engagement with or simultaneous disengagement from the latch gear segment mechanism dependency upon whether the pivot pin of the second pawl mechanism is in contact with a first extreme part or a second extreme part of the second cam mechanism, respectively.

The mechanism further includes a control mechanism for changing the throw of the lever mechanism to thereby change position of the pivot pin between the first and second extreme parts, a manual handle extending from the lever mechanism within convenient reach of the operator, and a manual knob member connecting the control means and neighboring the manual handle to provide a common grip in the palm of the operator.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein FIG. 1 is a side elevation of an embodiment of a hinge mechanism according to the invention, FIG. 2 is a sectional view taken on line II—II in FIG. 1, FIG. 2a is a sectional view taken on line IIa—IIa in FIG. 1, FIGS. from 3 to 7 are views similar to FIG. 1 but showing respectively various stages or modes of operation of the mechanism in FIG. 1.

DETAILED DESCRIPTION OF THE PREFERRED EMBODIMENT

Figure 3:
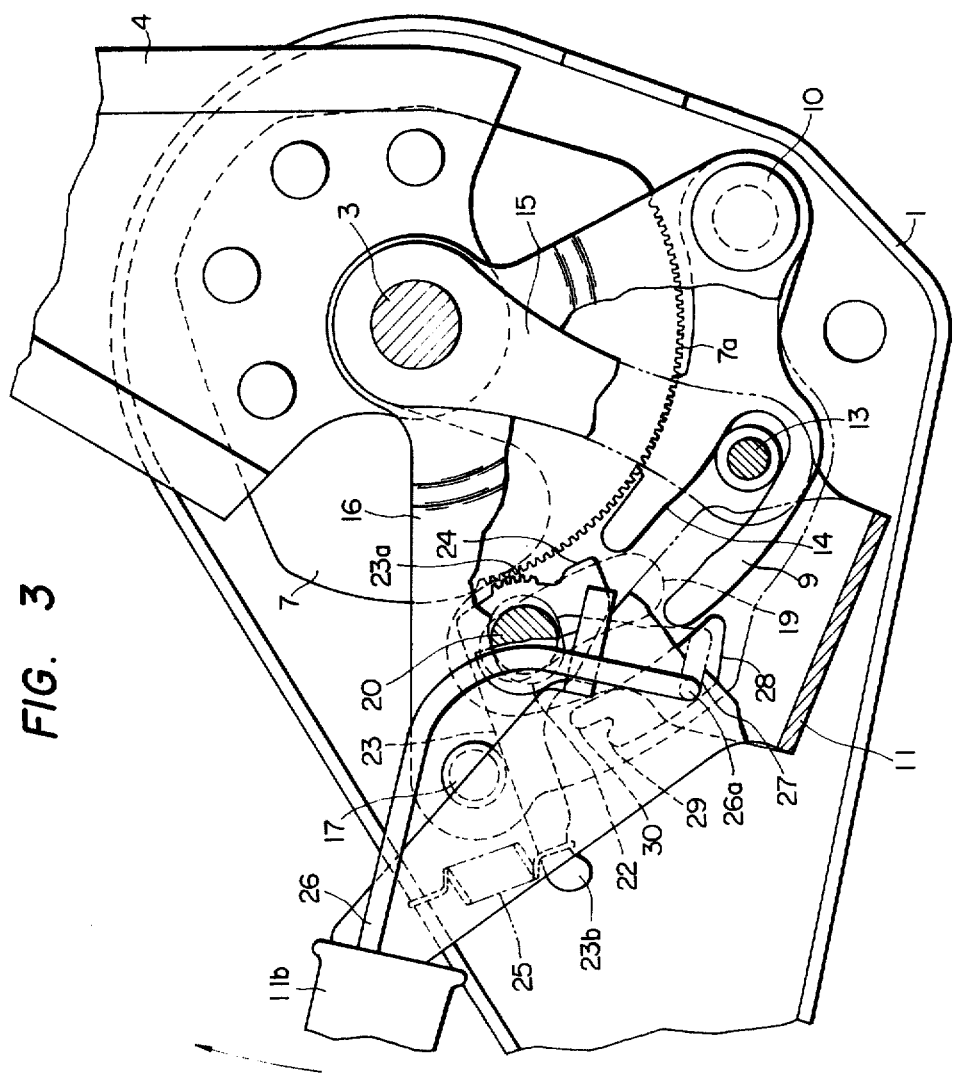

Referring now to the drawings, and more specifically to FIGS. 1 and 2 of the same, it will be seen that the mechanism according to the present invention includes a seat plate 1 adapted to be fixedly connected to a seat, (not shown), and a tiltable plate 4 adapted to be fixedly connected to a back rest, likewise not shown in the drawins. It is mentioned that in the various figures of the drawings only those parts of the two plates are shown which are necessary for the proper understanding of the present invention. All mechanisms for attaching the seat plate 1 and the tiltable plate 4 to the seat and the back rest are omitted from the drawings.

As seen, particularly in FIG. 2, seat plate 1 is reinforced by an edge flange 1a which also forms an anchor portion 1b for anchoring a spiral spring 6 to be described later in detail. Seat plate 1 and tiltable plate 4 are journalled on a shaft 3 which is operatively connected with tiltable plate 4 while plate 1 is free to rotate on shaft 3. A latch gear segment 7 is fixed to plate 4 by means of a plurality of rivets 8 concentric thereto for rotation around axis of the shaft 3. Plate 1 has holes 2 formed therein for being bolted to the base seat (not shown) at one side of the seat and plate 4 has a plurality of holes 5 for a like purpose. As best shown in FIG. 2, shaft 3 outwardly extends beyond a sub-plate 16 to be described later in detail and has a slit 3a formed therein. The slit 3a anchors a central end of the spiral spring 6 and the other external end of the spiral spring 6 is anchored as described in the foregoing by shoulder or anchoring portion 1b (FIG. 1) so that plate 4 and hence the back rest (not show) is normally spring-urged toward the counterclockwise rotation around shaft 3 in FIG. 1. It should be noted that the rotation of plate 4 in such direction corresponds to the direction toward the front side of the passenger on the seat.

As shown at the right bottom in FIG. 1, a pawl 9 is pivoted to plate 1 by means of a pin 10 and has an arcuate series of teeth in meshing relation with teeth 7a of latch gear segment 7. When in meshing relation with the latch gear segment, pawl 9 locks latch gear segment 7 and hence plate 4 at a selected inclination angle, releasing, however, when in disengagement from latch gear 7. Plates 1 and 4, latch gear segment 7, and pawl 9 form a main part of a mechanism in which the relative position of two plates 1 and 4 can be gradually adjusted by turning a handle and in which, if desired, the tiltable hinge member or plate 4 may be tilted freely with respect to fixed plate 1 to thus provide for a quick adjustment of the back rest relative to plate 1. The mechanism will be described in greater detail hereinbelow.

A lever 11 at the central bottom in FIG. 1 is pivoted to plate 1 by common shaft 3. As best shown in FIG. 2 in axial cross section, lever 11 is U-shaped and within the interior of the U-shaped cross section are interposed latch gear segment 7 and sub-plate 16. Sub-plate 16 is firmly connected with plate 1 by a pin 17 and common pin 10 so as to form a thin clearance between plate 1 and sub-plate 16. Plate 1 and sub-plate 16 cooperate to form a frame of structurally reliable rigidity and provide a better support of shaft 3 and pin 10. The outside arm 11a of lever 11 anchors one end of a coiled large spring 12, the other end of which is anchored to reinforcing flange 1a as shown in FIG. 1 at the right bottom portion, so that lever 11 is normally urged toward counterclockwise rotation around shaft 3 in FIG. 1. Lever 11 is kept in the rest position shown by cooperation of spring 12 and a non-illustrated stopper member. Lever 11 carries a pin 13 (FIG. 2) in cooperation with an arm 15 which is free to rotate on shaft 3. Arm 15 associates with lever 11 to provide better support of pin 13. Pin 13 is slidingly fits in a slot cam 14 in pawl 9 as best shown in FIG. 3 in enlarged scale. Pin 13 is further free to move in an arcuate window or slot 18 in sub-plate 16 shown in dotted lines in FIG. 1. Slot cam 14 is so shaped that the position of pawl 9 in mesh with and being unmeshed with latch gear segment 7 can be assured in dependency upon two different positions of pin 13 relative to cam slot 14.

Figure 4:
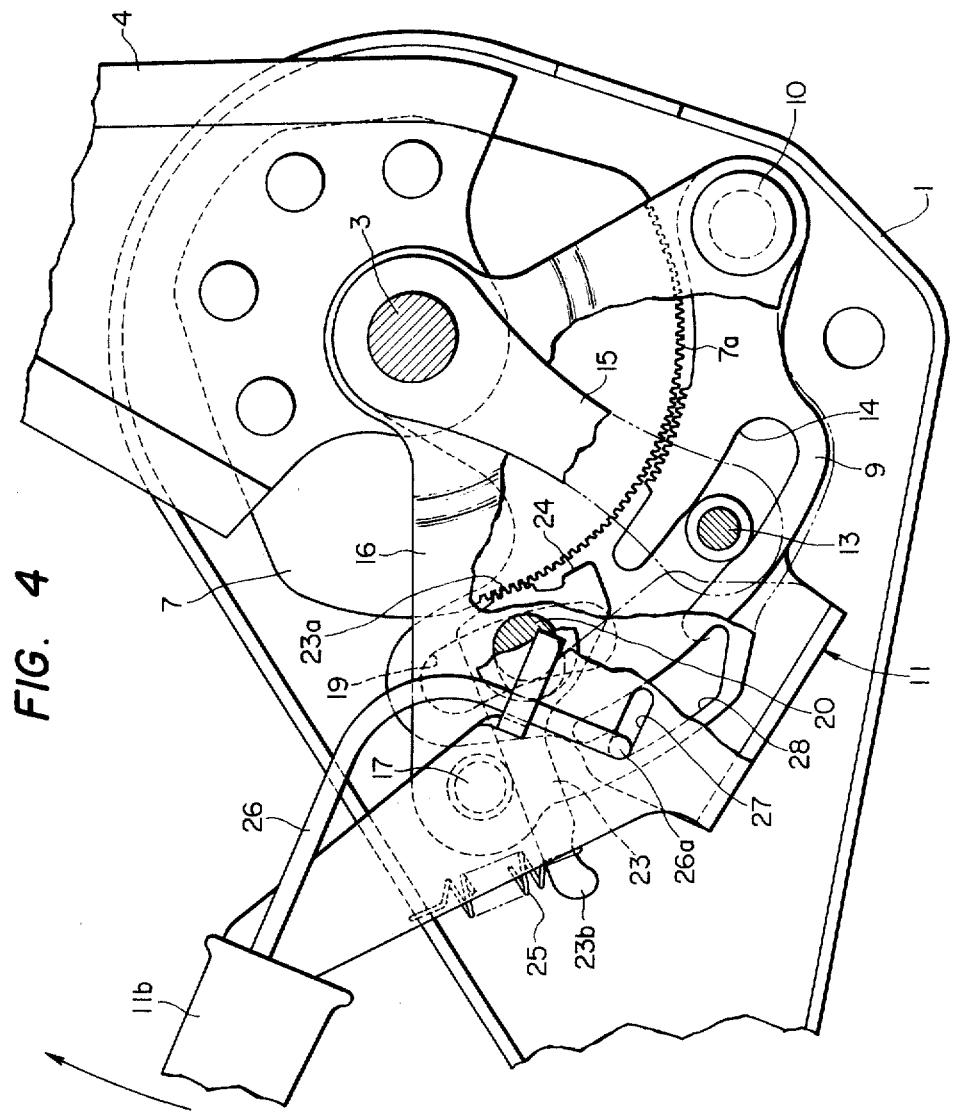

The mechanism is further provided with a device for gradually adjusting the relative position of two plates 1 and 4 without necessity of any conscious effort by the operator. As shown in phantom lines in FIG. 3 at the central portion, lever 11 is formed with an arcuate cam slot 19. In cam slot 19 is slidingly fitted a pin 20 of a second pawl 23. As best shown in FIG. 2a, the pin 20 projects from opposite sides of pawl 23 with both extremities slidingly fitting in guiding radial slots 21 and 22 in base plate 1 and sub-plate 16, respectively. As seen in FIG. 3, the curvature of cam slot 19 is convex relative to shaft 3 so that rotation of lever 11 around shaft 3 urges pawl 23 and hence teeth 23a thereof to a position in mesh with the latch gear teeth 7a as shown in FIG. 4 on a first stage of such rotation and further rotation of lever 11 to a second stage shifts teeth 23a out of meshing engagement with latch gear teeth 7a. It should be noted that on the first and second stages of of rotation of lever 11, first pawl 9 is held in a position out of mesh with latch gear teeth 7a by the cooperation of first cam slot 14 and pin 13.

Figure 5:
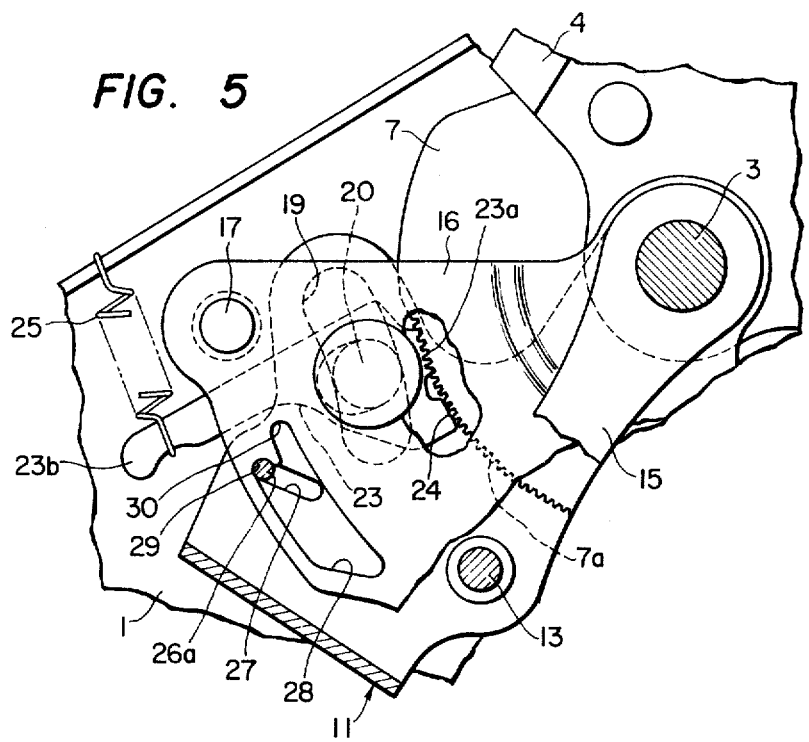
Figure 6:
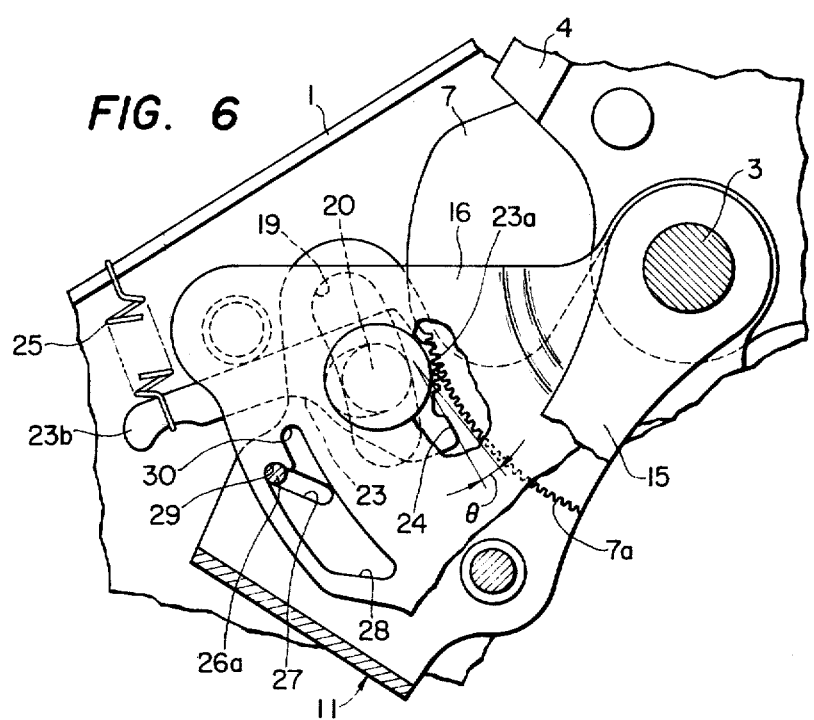

As shown in FIG. 3 at the left, second pawl 23 has an extending arm 23b which is normally spring-urged toward clockwise rotation around pin 20 by a coiled spring 25 shown in phantom. Rotation of second pawl 23 is restricted by pin 17 located to serve as a stopper member other than a connecting member for seat plate 1 and sub-plate 16. Second pawl 23 has a non-toothed portion 24 on its periphery, the height of which is so calculated that teeth 23a and non-toothed portion 24 may co-engage teeth 7a of latch gear segment 7 on the first rotational stage of lever 11 as best shown in FIG. 5. In this stage the second pawl 23 locks latch gear 7 and hence tiltable plate 4 in position. However, prior to the position shown in FIG. 5, pawl 23 first occupies a position shown in FIG. 4 in which teeth 23a are in mesh with latch gear 7 while non toothed portion 24 is out of contact with latch gear 7. Since plate 4 and hence latch gear 7 are normally urged toward clockwise rotation around shaft 3 due to the passenger's weight, the position shown in FIG. 4 is immediately followed by the position shown in FIG. 5 while latch gear segment 7 is allowed to rotate through a slight angle which is proportional to an angle $\theta$ shown in FIG. 6. The action of pawl 23 will be further described as the description proceeds in greater detail.

As shown in FIG. 5 in enlarged scale, sub-plate 16 is formed with a large window 28. Window 28 has a contour to provide stopper portions 29 and 30. As shown in FIG. 1, a bell crank form rod 26 is slidably supported by a handle 11b and associating members of lever 11. The free end of rod 26 is formed into a finger 26a (FIG. 5) normal to the plane of the drawing. Finger 26a is captive in the window 28 while being guided in an elongated guide hole 27 cut in lever 11. As seen, finger 26a severs to engage with stopper portion 29 when the finger occupies the left extremity portion of guide slot 27 as shown. In contrast, when finger 26a occupies the opposite extreme position in guide slot 27, finger 26a is engageable with other stopper portion 30 of window 28. As will be seen, two stopper potions 29 and 30 have locations which are radially circumferentially different from each other. Such difference assures different angles of rotation of lever 11 around shaft 3 and hence different positions of pawl 23 in mesh with and unmeshed with latch gear segment 7, while first pawl 9 is out of mesh with latch gear segment 7.

Handle 11b of lever 11 and a knob 26b of rod 26 are together within convenient reach of the operator at one side of the seat. Knob 26b is normally urged to the position shown in handle 11b by a (not shown) spring and a revealed portion of the knob is of adequate size to provide a full stroke of finger 26a in guide slot 27.

Operation of the mechanism may be explained as follows.

In the first mode of operation in which knob 26b is positioned at the left side as shown in FIG. 1, turning of the lever 11 as included by the arcuate arrow in FIG. 1 takes first pawl 9 out of mesh with latch gear segment 7 as shown in FIG. 4, while second pawl 23 comes into engagement with latch gear segment 7. In this stage, latch gear segment 7 is caused to rotate around shaft 3 due to the passenger's weight applied to the back rest and hence to latch gear segment 7. The rotation of latch gear segment 7 is restricted to a slight angle which is proportional to an angle shown in FIG. 6 as $\theta$ by the action accomplished by second pawl 23. In detail, moment teeth 23a of the second pawl 23 comes into mesh with teeth 7a of segment 7, latch gear 7 rotates until non-toothed portion 24 abuts against the heads of teeth 7a. The throw of lever 11 in this action is restricted by cooperation of finger 26a and stopper portion 29 of window 28. Anlge θ is so calculated in design that about two or more turns of lever 11 may attain a suitable value of the inclination angle of the back rest. This is effective in avoiding over adjusting or under adjusting of the back rest which has been experienced by the conventional type mechanism.

In a second mode of operation, knob 26b is first pushed by the operator's thumb. Finger 26a of rod 26 accordingly occupies the right end portion of guide slot 27. Handle 11b is then upward pulled by the operator until finger 26a abuts against stop portion 30 of window 28. The throw of lever 11 in this mode of operation is larger than that of the first mode of operation so that pin 20 of second pawl 23 engages another portion of slot cam 19. The distance between shaft 3 and pin 20 is larger than is provided in the first mode of operation. Second pawl 23 therefore has its teeth 23a unmeshed from latch gear segment 7 as shown in FIG. 7 while first pawl 9 is also out of mesh with segement 7. Latch gear 7 and hence tiltable plate 4 is therefore free to tilt to any position to thus provide for quick adjustment of the back rest relative to the seat.

When manual handle 11b is freed from the operator's palm either in the first or the second mode of operation, lever 11 and its associating parts immediately restore the original positions shown in FIG. 1.

Obviously, numerous modifications and variations of the present invention are possible in light of the above teachings. It is therefore to be understood that within the scope of the appended claims, the invention may be practiced otherwise than as specifically described herein.

What is claimed is:

1. A mechanism for adjustably connecting a seat and a back rest, especially for motor vehicles, comprising:
   a seat plate adapted to be fixedly connected to the seat;
   a tiltable plate adapted to be fixedly connected to the back rest;
   pivot means pivotally connecting said seat plate and said tiltable plate together;
   spring means for normally urging said tiltable plate toward forward turning upon positioning of a passenger on the seat
   a latch gear segment fixed to said tiltable plate;
   first pawl means having a number of teeth formed on the periphery thereof for selective meshing engagement with said latch gear segment and being pivoted to said seat plate;
   lever means pivoted to said plate and operatively connected to said first pawl means through first cam means;
   second pawl means having a number of teeth formed on the periphery thereof selective meshing with said latch gear segment;
   a pivot pin member connected with said second pawl means and operatively connected to said lever means through second cam means;
   guide slot means slidably engaged by said pivot means of said second pawl means, wherein said second pawl means further comprises a separate non-toothed portion on the periphery thereof of a height such that said teeth and said non-toothed portion co-engage said latch gear segment for locking said latch gear segment in postion, the relation between said first cam means and said second cam means being such as to assure alternate engagement with and simultaneous disengagement from said latch gear segment depending upon whether said pivot pin member of said second pawl means engages a first part of a second part of said second cam means, respectively;
   control means for changing the throw of said lever means to thereby change a position of said pivot pin member between said first and second parts of said second cam means;
   a manual handle extending from said lever means within convenient reach of the operator; and
   a manual knob member connecting said control means and neighboring said manual handle for providing a common grip by a palm of the operator;
   wherein said first cam means further comprises a slot cam cut in said first pawl means and a pin member projecting from said lever means for sliding fit in said slot cam and wherein said second cam means further comprises an arcuate slot cam cut in said lever means and said pivot pin member projects from said second pawl means for slidingly fitting in said arcuate slot cam, said arcuate slot being shaped in curvature such that a smaller throw of said lever means causes said pivot pin member of said second pawl means in said first part and a larger throw of said lever means causes said pivot pin member in said second part of said arcuate slot cam;
   and further a sub-plate fixedly connected to said seat plate for reenforcing said seat plate and which is in parallel with said seat plate so that a thin compartment is formed between said seat plate and said sub-plate such that latch gear segment, said first and second pawl means and a part of said lever means are mounted within said compartment; and
   wherein said control means for changing the throw of said lever means further comprises a window cut in said sub-plate and a rod having a finger portion disposed in said window, and wherein said window further comprises first and second stopper portions radially circumferentially spaced apart from each other, said rod being slidably supported by said lever means so as to shift said finger portion between first and second positions in said window engageable with said first and second stopper portions, respectively.

2. A mechanism as defined in claim 1, wherein said guide slot means slidably engaged by said pivot means of said second pawl means further comprising a first and second radially elongated and locationally dimensionally identical slot respectively formed in said seat plate and said sub-plate.

* * * * *